United States Patent [19]
Fujimoto et al.

[11] Patent Number: 5,627,944
[45] Date of Patent: May 6, 1997

[54] PARALLEL DATA PROCESSING SYSTEM

[75] Inventors: Katsuhito Fujimoto; Hideki Yoshizawa; Tatsushi Otsuka, all of Kawasaki, Japan

[73] Assignee: Fujitsu Limited, Kawasaki, Japan

[21] Appl. No.: 248,642

[22] Filed: May 25, 1994

[30] Foreign Application Priority Data

Jun. 18, 1993 [JP] Japan .................... 5-148017

[51] Int. Cl.$^6$ .................... G06F 15/80; G06F 15/18
[52] U.S. Cl. .................... 395/27; 395/24; 395/800; 364/133
[58] Field of Search .................... 395/24, 27, 800; 364/133

[56] References Cited

U.S. PATENT DOCUMENTS

| | | | |
|---|---|---|---|
| 4,942,517 | 7/1990 | Cok | 364/DIG. 1 |
| 5,091,864 | 2/1992 | Baji et al. | 395/27 |
| 5,323,335 | 6/1994 | Mitchell | 364/572 |
| 5,421,019 | 5/1995 | Holsztynski et al. | 395/800 |
| 5,506,998 | 4/1996 | Kato et al. | 395/800 |

FOREIGN PATENT DOCUMENTS

| | | |
|---|---|---|
| 0421639 | 4/1991 | European Pat. Off. |
| 3105584 | 5/1991 | Japan. |

OTHER PUBLICATIONS

Xu et al, "A High Performance Architecture for Real–Time Signal processing and Matrix Operations", IEEE International Symposium for Circuits and Systems, 1992.

Kung et al, "Parallel Architectures for Artificial Neural Nets", IEEE Inter. Conf. on Neural Network, 1988.

Primary Examiner—George B. Davis
Attorney, Agent, or Firm—Staas & Halsey

[57] ABSTRACT

A parallel data processing system uses a parallel learning method capable of having sufficient parallelness to shorten learning time and has plural data processing units, each connected to a data transfer unit and having a unit for holding execution parameters as are required for data processing, a unit for holding partial sample data which comprises at least part of the full sample data necessary for the required data processing, an adjustment value calculation unit which calculates, from partial sample data stored in the unit for holding partial sample data and from the execution parameters held in the execution parameter holding unit, adjustment amounts related to the execution parameters with regard to the partial sample data and, further, an accumulator which, when calculating the overall total of the execution parameter adjustment amounts with regard to the full sample data, accumulates the adjustment amounts related to the execution parameters with regard to the partial sample data at the data processing units and the adjustment amounts related to the execution parameters with regard to the partial sample data at other data processing units by the data transfer unit.

3 Claims, 9 Drawing Sheets

$Y = f(U)$; F DENOTES SIGMOID FUNCTION
$U = \Sigma_{i=1 \sim n} W_i X_i$

PARALLEL DATA PROCESSING SYSTEM

BACKGROUND OF THE INVENTION

The present invention relates to a parallel data processing method, and more specifically to a parallel data processing system which uses a plurality of data processing units in synchronized manner.

DESCRIPTION OF THE RELATED ART

In recent years, in systems such as computers and digital signal processing devices, with a broadening of the field of application of data processing, the amount of data processed has become extremely large, and in particular in the fields of image or speech processing which require data processing, it becomes important to utilize a number of data processing units in synchronization to process data in parallel. In general, an important principle in using a number of processing units to process data is the plurality effect. This is the improvement in data processing speed which is proportional to the number of data processing units available, and it is extremely important in parallel data processing to have a good plurality effect.

The main cause for a worsening of the plurality effect, in addition to the intrinsic limitations the problem itself places on parallel processing, is the addition of the time required for data transfer to the actual time required for data processing, causing a lengthening of the total processing time. Therefore, while full utilization of the data transmission path is important in improving the plurality effect, this is quite difficult.

However, in the case in which the processing is performed in a regular manner, it is possible to utilize this regularity to improve the plurality effect. Data is passed as a systolic array, that is as circulating data with operations executed when two data meet in the data flow. Methods of utilizing the regularity of processing in parallel processing is known as the systolic array methods. Of these, the method called the ring systolic system that uses a one-dimensional systolic array is a parallel data processing method which processes systolic data by periodically using a number of data processing units, and this is relatively easy to implement. Processing that exhibits regularity is such processing as matrix calculations based on the calculation of vector inner products, and parallel processing which outputs to neural network product sum calculations via non-linear functions.

A method of performing such processing is, for example, the common bus linked parallel processing method shown in FIG. 9.

In FIG. 9, 91 is a processor element, 4 is a memory, 93 is a common bus, 92 is a bus connected to the common bus, and 94 are internal buses which connect each of the processor elements with their corresponding memories 4. In this common bus linked parallel processing system, communications between the processor elements (hereinafter referred to as PEs) is performed via the common bus 93. Since one data is placed on the bus in a specific time period, it is necessary to establish the overall synchronization of communications via the common bus over the entire common bus.

Another known system is the ring systolic system shown in FIG. 10.

In that drawing, 91 is a processor element (PE). Each of the PEs is connected via the ring bus 95. 96 is a memory which holds the coefficients $W_{ij}$. $W_{11}, W_{12}, \ldots, W_{xy}$ are the elements of a coefficient matrix, with $W_{ij}$ being the ij component of the matrix. The multiplication of this coefficient matrix W by the vector $x=(X_1, X_2, X_3)$ is performed as follows in this ring systolic method.

FIG. 11 shows the internal structure of the i-th processor element (PE) indicated by 91. In this drawing, 131 is a multiplier, 132 is an adder, 135 is an accumulator (ACC), and 96 is a group of registers which hold the coefficient elements $W_{ij}$. This group of registers is a FIFO (first-in first-out) group of registers, in the form so that the that the coefficients $W_{ij}$ related to the i-th row of the coefficient matrix, that is, the j-th column elements are output. These FIFO registers are circulated at the next output clock, and are input again from the rear via the bus 95. Therefore, as shown in the drawing, $W_{ij}, \ldots, W_{i,j-1}$ have already been circulated and stored from the rear.

Each element of the vector is input via the bus 95. At present, element $X_j$ is input. The internal product results of $W_{i1} \times X_1 + \ldots + W_{i,j-1} \times X_{j-1}$ are already stored in accumulator 135. These are now output from the accumulator 135 and input to one input of the adder 132. The externally received $X_j$ and $w_{ij}$ output by the FIFO are multiplied together by the multiplier 131, the results being input to the other input of the adder 132 and added current contents the accumulator 135, and added to the same accumulator 135 at the next clock. By repeating these operations, the inner product of the i-th row vector of the coefficient matrix W with the column vector externally applied is calculated. In addition, the switch selects whether the data Xi is to be externally output or taken internally and set into accumulator 135. In such PEs, when calculating a product of a matrix times a vector, as shown in FIG. 10, first PE- 1 multiplies $W_{11}$ and $X_1$, and in the next clock period because $X_2$ flows into PE-2 from the right side and $W_{12}$ is output from the memory 96, the calculation $W_{12} \times X_2$ is performed. In the same manner, at the next clock, the multiplication of $W_{13} \times X_3$ is executed, this enabling the multiplication of the 1st column of the coefficient matrix by the vector X at PE- 1. The product of the 2nd column and the vector is taken at PE- 2. That is, $W_{22}$ and $X_2$ are multiplied together, in the next clock period $W_{23}$ and $X_3$ are multiplied, in the next clock period $W_{21}$ is multiplied by the recirculated $X_1$, and in the next clock period $W_{21}$ is multiplied by the recirculated $X_1$. In the same manner, the product of the 3rd column and the vector can be taken by multiplying $W_{33}$ and $X_3$, multiplying $W_{31}$ with the recirculated $X_1$, and multiplying $W_{23}$ with the recirculated X2 to calculate the inner product. Therefore, in these operations, it is possible to simultaneously perform the multiplications of $W_{11}$ with $X_1$, $W_{22}$ with $X_2$ and $W_{33}$ with $X_3$. However, as shown in the drawing, in order to perform these operations simultaneously, torsion occurs in the arrangement of the elements of the matrix. In a ring systolic array method such as this, by performing the data transfer between each of the PEs in synchronization with the data processing at each of the PEs it is possible to make effective use of the data transmission path and, therefore, obtain a favorable plurality effect.

FIG. 12 shows a multi-stage arrangement of the configuration of the ring systolic system of FIG. 10, this configuration being capable of taking the product of a continuous matrix and a vector. In a systolic array system such as this, the regular nature of the processing enables full utilization of the data transmission path capacity and, therefore, enabling achievement of an improvement in the plurality effect.

However, in the above-described common bus linked parallel system of the past, because the linking between processing elements (PEs) is done by means of a common bus, it is possible to transfer only one data a time. In addition, the linking by means of a common bus meant that synchronization of the entire bus was necessary. Common bus linked parallel systems of the past had the problem of there being few kinds of processing for which a good plurality effect could be achieved, and additionally the problem of the lengthening of the common bus as the number of linked PEs increases, making synchronization of the entire bus difficult. In addition, in ring systolic arrays of the past such as shown in FIG. 10 through FIG. 12, while it was possible to achieve a plurality effect by synchronizing the data transfer between each of the PEs with the processing at the PEs, this method requires that the timing of the data transfer between each of the PEs had to be adjusted with that of the data processing at each of the PEs. Further, in this method, if, for example in the case in which a rectangular matrix is to be multiplied by a vector, resulting in the optimum number of data processing units being different from the optimum number of data holding units, PEs which are not related to actual data processing are required, so that the number of PEs remaining idle becomes great, thereby causing the plurality effect to worsen. Stated differently, there is a strict correspondence between the solvable problems and the circuit configuration, and the plurality effect worsens when the size of the problem differs from the optimum value. Stated conversely, the problems which allow the achievement of a good plurality effect were specifically limited, making the method unsuitable for broad-ranging processing, lacking in flexibility or universality, making it difficult to implement a high-speed data processing system applicable to a processing having a degree of variety. To solve the above-described defects of prior art, a parallel data processing system such as described in FIG. 13 was proposed in Japanese Unexamined Patent Publication (Kokai) NO. 3-105584. The parallel data processing device shown in FIG. 13 comprises data processing units 91, trays 151 which perform data holding and data transfer, a shift register 152 formed by mutual connections between each of the trays, a 1st input to the data processing unit 153, a 2nd input to the data processing unit 154, a 1st input 155 of tray 151, a 1st output 156 of a tray, and a 2nd output of tray 2.

The processing units 91 perform data processing, and trays 151 perform transfer and form shift register 152, causing data to be shifted in circulating fashion. In this system, in determining the product of the m-by-n matrix A with the number of elements vector X, even if the number of rows m of the matrix A is smaller than the number of columns n, or if m is larger than n, it is possible to use m data processing units and n trays to obtain the product in a processing time that is proportional to n, thereby achieving a good plurality effect. In effect, as shown in FIG. 13, there are two individual inputs, and a function that performs a multiplication of the two inputs and a function that accumulates the results of that multiplication, that is a configuration comprising m data processing units 91 which execute an inner product calculation and n trays 151, Y is an accumulation register within the units, the data processing units multiply together the input from 153 and the input from 154, adding the resulting product to accumulation register Y, after which the elements of vector x are shifted between adjacent trays of the shift register 152. By repeating these operations n times, it is possible to perform the multiplication of an m-by-n matrix A by n-dimensioned vector in a processing time that is proportional to n. That is, in this system, by separating the data processing units 91 from the trays 151 which have the function of holding data, even if m and n differ in value, it is possible to obtain a good plurality effect without the need to perform processing to adjust the timing. In addition, data transfer between trays 151 is performed simultaneously and in parallel with the data processing of data processing units 91, so that it can generally be expected to possible to make the time for data transfer shorter than the time required for the data processing units to process data.

In the above-described parallel data processing system, in each of the plurality of data processing units 91 used is stored all of the plurality of sample data to be processed, all o the execution parameters required for this processing being divided as appropriate among the number of data processing units 91, these distributed partial execution parameters being stored in each of the data processing units 91.

Therefore, in this previous parallel data processing system, if we consider, for example, the case of performing neurocomputer calculations, each of the data processing units 91 in this system forms a neuron, and in the case in which, or example, adjustment amounts for weighting values to be applied to the synapses connected to each of the neurons expressed as sigmoid functions are to be calculated, while basically these are determined based on both of the abovementioned data stored in the data processing units 91 of this system, in determining these adjustment amounts, because the adjustment amount data just before execution of the calculation is used and further because of the general requirement to simultaneously calculate the adjustment amounts for sample data surrounding the sample data to be calculated, when it is desired to use adjustment amount data related to sample data not stored in a processing unit 91, it is necessary to read out of an adjacent or distantly located data processing unit 91 the required adjustment amount data, and or that reason it is necessary to obtain the required data by using a communications means.

For that reason, in the parallel data processing system of the past as described above, there is a need to use a communications means quite frequently, although it is possible to achieve an apparent communications time by performing simultaneous parallel processing of the data transfer between trays and the data processing performed by the data processing units.

However, in this data processing system, because the learning time increases in proportion to the amount of sample data, if a large amount of sample data is used relative to the amount of execution parameters, because there is a limit to the number of parts the execution parameters can be divided into, it is not possible to achieve a level of parallelness capable of absorbing the large amount of sample data, and a huge amount of learning time was required.

SUMMARY OF THE INVENTION

An object of the present invention is to provide a parallel data processing system which solves these problems existing in the prior art, and which uses a parallel learning method that can be given enough parallelism to shorten the learning time.

In order to achieve the above-mentioned object, the present invention makes use of the following technical configuration.

Specifically, in a parallel data processing system comprising a plurality of means for data processing and a means for data transfer wherein each of the means for data processing is connected to the means for data transfer, the present invention is a parallel data processing system wherein each of the means for data processing is provided with a means for holding the execution parameters required for data processing and a means for holding partial sample data which holds at least part of the full sample data necessary for the required data processing, and comprises a means for adjustment value calculation which calculates, from the partial sample data stored in the means for holding partial sample data and from the execution parameters held in the means for holding execution parameters, adjustment amounts related to the execution parameters with regard to the partial sample data, and an accumulation means which, in calculating the overall total of the execution parameter adjustment amounts with regard to the full sample data, accumulates the adjustment amounts with regard to the execution parameters with regard to partial sample data at the means for data processing and the adjustment amounts with regard to the execution parameters with regard to partial sample data at the other means for data processing via the means for data transfer.

The parallel data processing system according to the present invention has the above-described technical configuration, and thus is different from parallel data processing systems of the past, and in it all of the execution parameters for the processing to be performed are stored at each of a plurality of means for data processing making up the parallel data processing system, and all the sample data required for said processing are divided up as appropriate among the number of means for data processing, the split up partial sample data being stored in the individual means for data processing.

That is, in the parallel data processing system according to the present invention, the methods of storage and calculation of sample data and execution parameter differ from those of the previously described parallel data processing systems of the past, and in the present invention it is possible with regard to the partial sample data stored in one means for data processing to complete the calculations related to the adjustment amounts for the weighting amounts by using all of the execution parameters which are already stored in the means for data processing, so that with regard to the range of the calculation processing, the need to obtain or read required information from other means for data processing via a means for communication, such as existed in the past, is completed eliminated, and while in the last step of the processing, in which the overall adjustment amount is determined, while it is necessary to transmit data processed by each data processing means, at least one time, utilizing a data communication means, in the step of accumulating the adjustment amount data processed by each means for data processing, the time required for communication in this step is extremely small, and thus the processing time in the present invention is greatly shortened in comparison with previous systems.

Essentially, in the present invention, it is possible to increase the parallelism with an increase in the number of sample data, and in the case in which the number of sample data is large compared with the number of execution parameters, there is a great shortening of the learning time in comparison with the prior art.

DESCRIPTION OF THE PREFERRED EMBODIMENT

The following is detailed description of a concrete embodiment of a parallel data processing system according to the present invention, with reference made to drawings.

Figure 1:
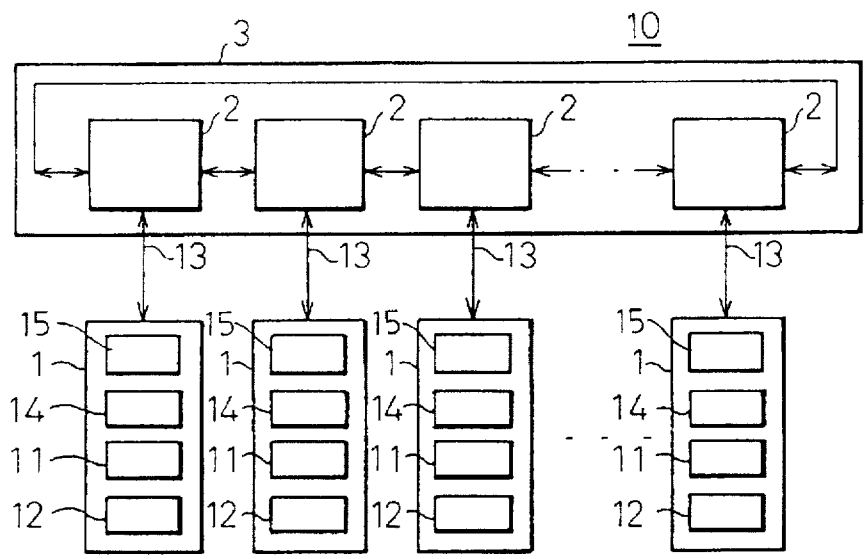
FIG. 1 is a block diagram that shows an example of a parallel data processing system according to the present invention.

FIG. 1 is a block diagram that illustrates the general configuration of a parallel data processing system 10 according to the present invention, which as shown in the drawing comprises a plurality of means for data processing 1 and a data transfer means 3 which includes a plurality of means or data holding, and further wherein the means for data processing i are each connected to a means for data holding 2 which is includes within the means for data transfer 3, and in which parallel data processing system 10 each of the means for data processing 1 is provided with an execution parameter holding means 12 for holding the execution parameters required for data processing and a partial sample data holding means 11 lot holding at least part of the full sample data required for the data processing, and wherein at each data processing means 1, there is provided an adjustment amount calculation means 14 that performs calculation of the adjustment amount related to the execution parameters with regard to the partial sample data from the partial sample data held by the partial sample data holding means 11 provided at the data processing means 1 and from the execution parameters held by the execution parameter holding means 12 provided at the data processing means, and further provided with an adding means 15 which performs addition with the calculation results of an other data processing means via the data holding means 2 provided within the data transfer means 3.

The parallel data processing system according to the present invention is related to a parallel learning system which uses a plurality o partial learning means in synchronization to execute learning, having as its main objectives the execution of recognition, prediction, and movement control. Its basic configuration includes at least one partial learning means that holds execution parameters and partial sample data, at least one transfer data holding means that is connected to the partial learning means by means of an input/output bus, and a data transfer means that performs transfer of data that is held in the transfer data holding means, by performing calculations without communication of the adjustment amounts of the execution parameters wilt regard to the partial sample data, and further by using the data transfer means to determine the overall total of the adjustment amounts of the execution parameters with regard to all the sample data, learning ms executed at high speed or use in execution of operations such as recognition, prediction, and movement control.

In this case, the learning means corresponds to the data processing means in the basic configuration of the present invention.

Next, the basic processing method employed in a parallel data processing system according to the present invention, particularly when using a neural network and particularly when performing calculations on a number of matrices in accordance with a given algorithm will be described.

In general, the implementation of system such as the present invention, in which either it is impossible to describe clearly the system operation, or changes in the operating environment make it necessary to adjust the execution parameters which establish the system's operation either before or during execution.

A system in which the execution parameters are adjusted either before or during execution ms known as an adaptive system.

The method of learning the execution parameters based on the sample data of the input-output relationship expected for the system is an effective execution parameter adjustment means, and is for that reason widely used, and a variety of learning methods have been propose.

In addition, to achieve an adaptive system that is more flexible and corresponds better to the real world, it is necessary to be able to handle more data, and this leads to an increase in the amount of data calculations performed for the purpose of learning.

Because a quick-responding system that responds to the real world in real time is desirable, it is necessary to shorten the time required to perform the increased amount of calculations for learning.

For this reason, the shortening of the learning time is extremely important in an adaptive system. One technique which is playing an important role in shortening the learning is that of increasing the speed of learning by using parallel learning.

Next, referring to FIG. 2 and FIG. 3, a three-layer hierarchical neural network error reverse-transmission learning algorithm will be described in brief.

Figure 2:
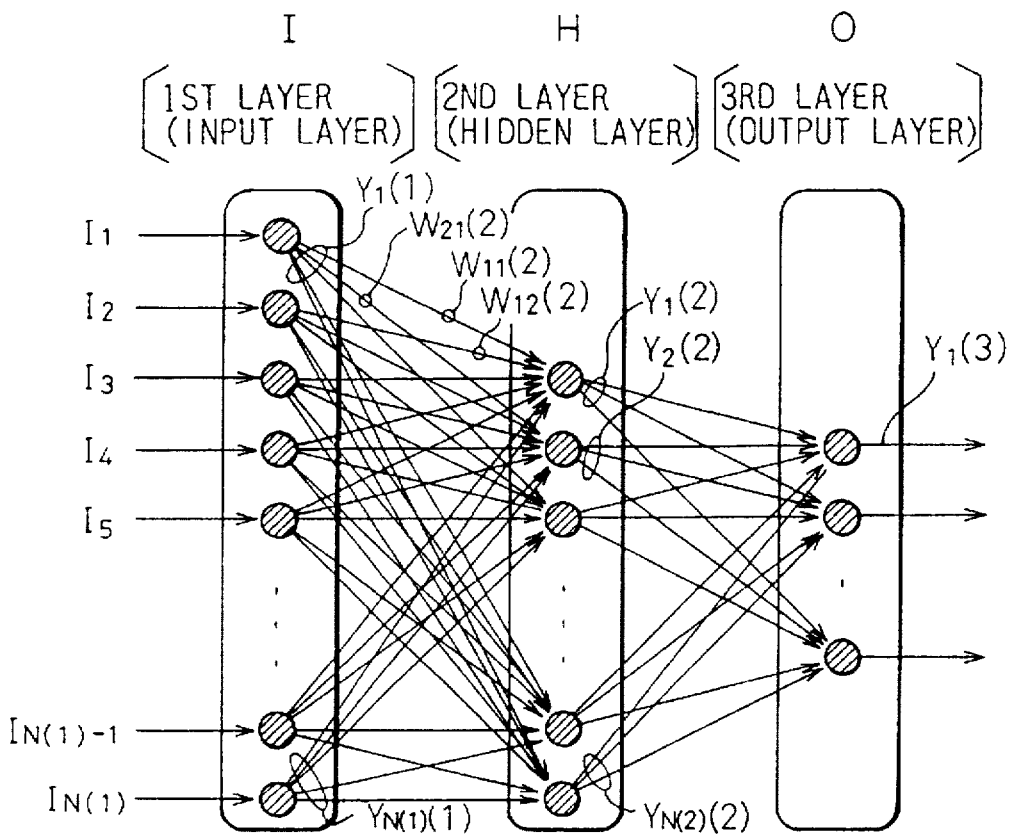
FIG. 2 is a drawing that shows a neuron model that is one form of data processing means used in a parallel data processing system according to the present invention.
Figure 3:
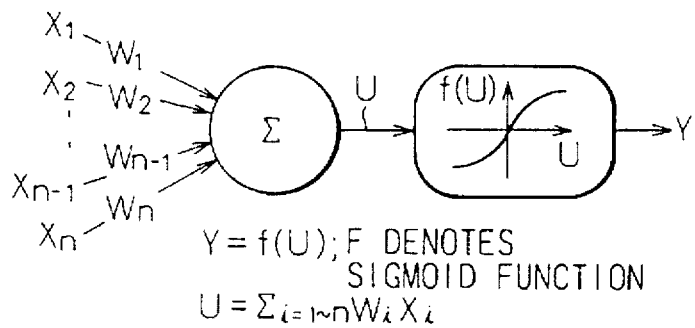
FIG. 3 is a drawing which describes the relationship between the input and output in the neuron model shown in FIG. 2.

In FIG. 2, the input level states are indicated by I, the hidden level states are indicated by H, and the output level states are indicated by O. If the number of input level neurons is $N_i$, the number of hidden level neurons is $N_h$, and the number of output level neurons is $N_o$, we have the following relationship.

$$I=(i_1 i_2 \ldots i_{Ni})^T$$

$$H=(h_1 h_2 \ldots h_{Nh})^T \quad (1)$$

$$O=(o_1 o_2 \ldots o_{No})^T$$

Where $^T$ represents transmission.

As a further explanation of the above relationships, FIG. 2 is a conceptual drawing of a hierarchical neural network which forms a neurocomputer having a 3-level structure consisting of an input level I, a hidden level H, and an output level O. The 1st input level I inputs the input signals $I_1$, $I_2$, ... $I_{N(1)}$. The 2nd hidden level H has each of its units, that is each of the neuron models connected to all of the neuron models of the 1 st level, the points of linking between them being the synapse links, with weighting $W_{ij}$ being given. The 3rd output level O, in the same manner has each of its neuron models connected to every unit of the hidden level H. The outputs of this are output externally. In performing learning in this neuron network, determination is made of the error between the input patterns applied to the input level I, which correspond to the teacher data and the output signals output by the output level O, weighting between hidden level H and the output level and the weighting between the 1st and 2nd levels being established so that this error is extremely small. This algorithm known as the back-propagation law, that is, the back propagation learning law. The weighting values determined by the back-propagation learning law are stored and if, for example, they are to be used in associative processing for recognition, if an incomplete pattern slightly skewed from the pattern to be recognized is applied to the 1st input level, the output signals corresponding to that pattern are output from the output level, output signals being very similar to the teacher signals applied for that pattern during learning. If the difference from the teacher data is very small, the incomplete pattern will be recognized.

It is possible to achieve an engineering implementation of operation of this neural network using the neurocomputer shown in FIG. 1. In addition, in the concrete embodiment given above, the weighting applied to each of the synapses are determined beforehand, as shown in FIG. 3. That is, FIG. 3 shows an example of a neuron model which forms the basic element of calculations performed by a neurocomputer. In the neuron model, each of the synapse links of the inputs $X_1$, $X_2$, ..., $X_n$ are multiplied by the weights $W_1$, $W_2$, ..., $W_n$, overall sum of these being then determined as the internal value U. This U is then operated on by a non-linear function f, the output being taken as Y. An S-shaped sigmoid function such as shown in the drawing is generally used as the non-linear function.

In the above-mentioned configuration, the weighting of the synapse connecting the p-th neuron of the input level I to the q-th neuron of the hidden layer H is $W_{pq}^{(ih)}$, and the weighting of the synapses connecting the q-th neuron of the hidden level H to the r-th neuron of the output layer O is $W_{qr}^{(ho)}$.

If the weighting matrices are $W^{(ih)}$ and $W^{(ho)}$, we can write the following relationships $$W^{(ih)}=(W_{pq}^{(ih)})$$

$$W^{(ho)}=(W_{qr}^{(ho)}) \quad (2)$$

Further, when input data is input to the input level I, the state O of the output level O is calculated as follows.

$$H=f(W_T I)$$

$$O=f(W_T H)$$

(Where f means the application of the above-mentioned sigmoid f to each element of the vector.

The sigmoid function f is a function, for example, like the following.

$$f(x) = \frac{1}{1+\exp(-x/G)} \quad (3)$$

In this function, G is the gain of the sigmoid function In addition, in general each of the sample data $S^{(k)}$ is given as a set of data consisting of the input data $I^{(k)}$ and the teacher data $T^{(k)}$.

$$S^{(k)} = (I^{(k)}, T^{(k)})(k=1 \ldots N_p)$$

$$I^{(k)} = (i_1^{(k)} i_2^{(k)} \ldots i_{Ni}^{(k)}) \quad (4)$$

$$T^{(k)} = (t_1^{(k)} \ldots t_{No}^{(k)})$$

In the above, $N_p$ represents the number of sample data, $N_i$ represents the dimension of the input data, and $N_O$ represents the dimension of the output data or teacher data.

The purpose of the learning in the data processing method of present invention is to determine weighting $W^{(ih)}$ and $W^{(ho)}$ such that, with respect to all the given sample data, the error between the output data calculated from the input data and the teacher data is within the allowable range.

An example of a method of determining the weighting would be the use of an algorithm disclosed, as mentioned previously, in Japanese Unexamined Patent Publication (Kokai) No. 3-105584, to determine the weighting $W^{(ih)}$ and $W^{(ho)}$ by using the product sum from the input and a sigmoid function, this processing being known as forward-looking processing.

To minimize the error between the output data and the teacher data with regard to weighting determined by the above-described method, the adjustment amounts $DW^{(ih\,kh)}$ and $DW^{(ho)\,(k)}$ are determined, and this calculation can be performed by what is generally known as the most rapid dropoff method. The processing of determining the weighting adjustments amounts DW is different from the above-mentioned processing, and is known as back-propagation.

Essentially, learning in a neurocomputer is the process of correcting the weight of each of the neurons until the desired relationship between input and output of the network is achieved. The learning method consists of preparing a number of pairs of input signal vectors and teacher data vectors, that is, as many as there data in the teacher set, and selecting one of these pairs, the input signal Ip being input to the learning network and a comparison being made of the network output in response to the input with the correct signal, that is, with the teacher data $O_p$ corresponding to that input signal. This difference is known as the error e, and this error e and the input and output signals at that time are used as the basis for correcting the weights for each of the neurons. This process is repeated until the learning converges for all the elements in the teacher data set. That is, all the weighting values number as many as there are input patterns are stored in distributed fashion. In this weighting correction process, known as back propagation, the error obtained at the output level is deformed as propagation proceeds in the reverse direction from the input, from which the method gets its name, back propagation algorithm.

A concrete embodiment of the back propagation algorithm is described in detail in the above-mentioned Japanese Unexamined Patent Publication (Kokai) No. 3-105584.

By using each of the above-mentioned methods, the weighting adjustment amounts $DW^{(ih)\,(k)}$ with respect to the sample data $S^{(k)} = I^{(k)}$, $T^{(k)}$ are calculated as follows.

$$e_r^{(o)(k)} = (o_r^{(k)} - t_r^{(k)}) o_r^{(k)} (1 - o_r^{(k)})$$

$$\Delta W_{qr}^{(ho)(k)} = -\epsilon^{(ho)} e_r^{(o)(k)} h_q^{(k)}$$

$$\Delta W^{(ho)(k)} = (\Delta W_{qr}^{(ho)(k)})$$

$$e_q^{(h)(k)} = \left( \sum_{r=1}^{N_o} W_{qr}^{(ho)(k)} e_r^{(o)(k)} \right) h_q^{(k)} (1 - h_q^{(k)}) \quad (5)$$

$$\Delta W_{pq}^{(ih)(k)} = -\epsilon^{(ih)} e_q^{(h)(k)} i_p^{(k)}$$

$$\Delta W^{(ih)(k)} = (\Delta W_{pq}^{(ih)(k)})$$

In the above, $e_r^{(o)\,(k)}$ represents the error of the r-th neuron of the output level with respect to the k-th sample data, and $e_q^{(h)\,(k)}$ represents the error of the q-th neuron of the hidden level with respect to the k-th sampled data. $\epsilon^{(ih)}$ and $\epsilon^{(ho)}$ represent a weighting learning constant between the input level and hidden level and a weighting learning constant between the hidden level and the output level, respectively.

Learning is completed when the output level error for all sample data converges to within the allowable limits. That is, learning is completed when the following condition is satisfied.

$$|o_r^{(k)} - t_r^{(k)}| \leq \text{allowance}$$

In this relationship, allowance is a constant representing the allowable range.

$O_r^{(k)}$ is the r-th output neuron output value with respect to the k-th sample data, and $t_r^{(k)}$ is the expected value of output from the r-th output level neuron with respect to the k-th sample data.

If the output level error of the sample data is not within the allowable limit, the weighting is adjusted and learning is started again. The weighting adjustment is expressed by the following equations.

$$W^{(ih)}: = W^{(ih)} + \Sigma \Delta W^{(ih)(k)}$$

$$W^{(ho)}: = W^{(ho)} + \sum_{k}^{k} \Delta W^{(ho)(k)}$$

Figure 4:
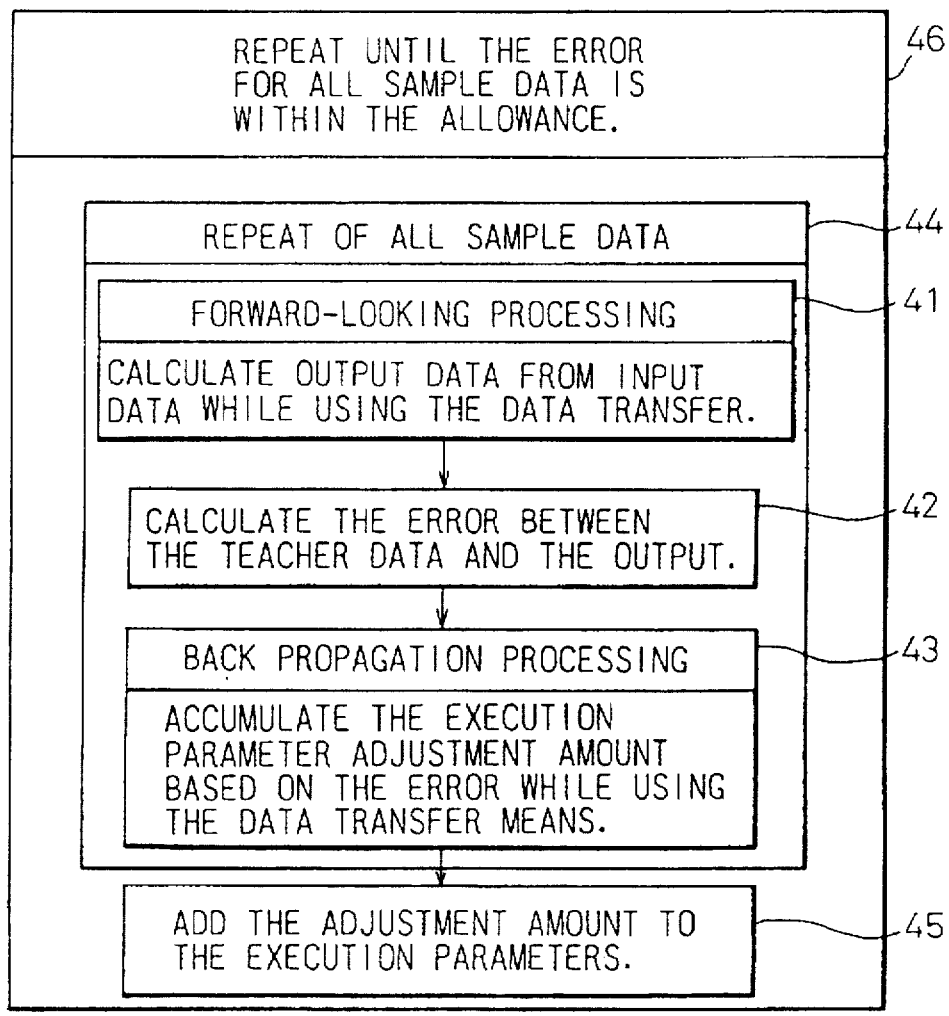
FIG. 4 is a flowchart which shows the calculation processing procedure of a parallel data processing system according to prior art.

Essentially, in parallel data processing systems in the past, the algorithm was something like that shown in FIG. 4 wherein at step 41 forward-looking processing is performed using data processing means 2 continuously to calculate output data from input data, and wherein at step 42 the error between the output data and the teacher data is calculated based on the resulting output data. Next, in step 43, back-propagation is performed, the execution parameter adjustment amounts DW being accumulated based on the errors previously obtained while using the data communications means. Thereafter the processing proceeds to step 44, at which, after each of the above-described is repeated for all the sample data, processing proceeds to step 45, at which the adjustment amounts obtained at the above-described steps are added to the execution parameters.

Then, this step is repeated until the error for all the sample data is within the allowable limit at step 46.

Figure 5:
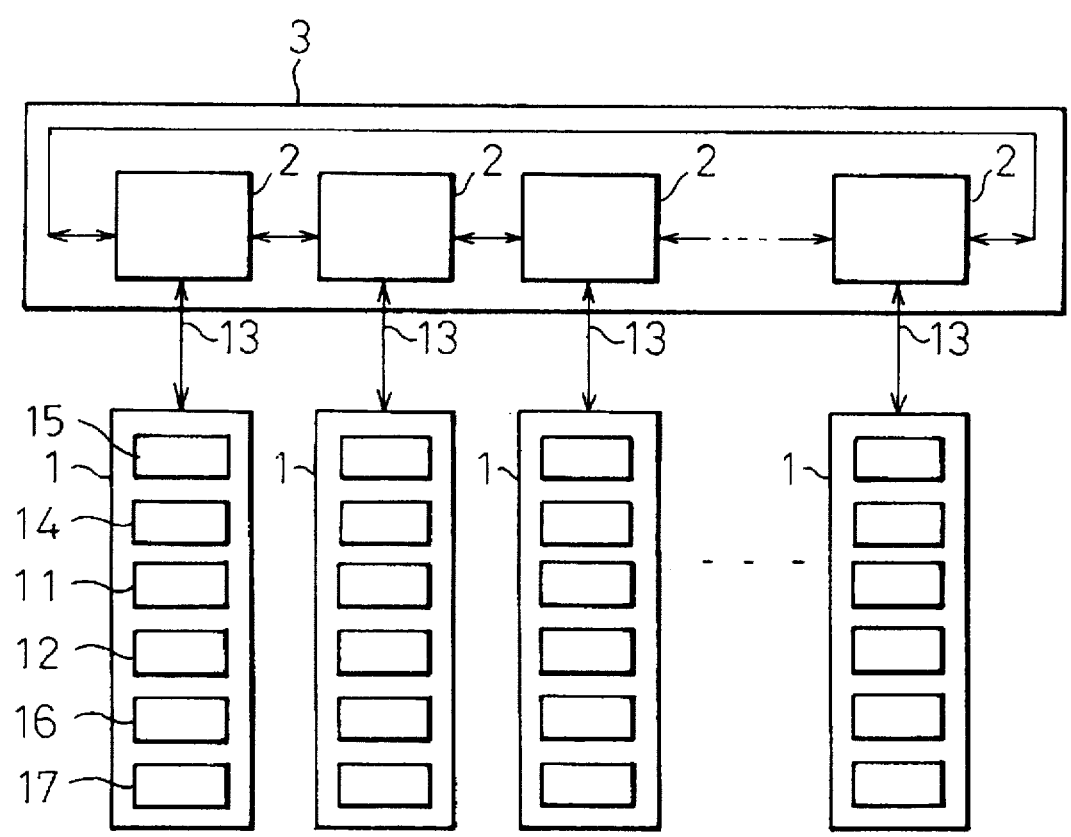
FIG. 5 is a block diagram which shows the configuration of the 1st concrete example of a parallel data processing system according to the present invention

Next, we will describe a concrete example of executing a data processing system according to the present invention using the data processing system shown in FIG. 5, based on the basic technological basis for the case of performing parallel data processing of a number of data as described above in a neural network.

Figure 6:
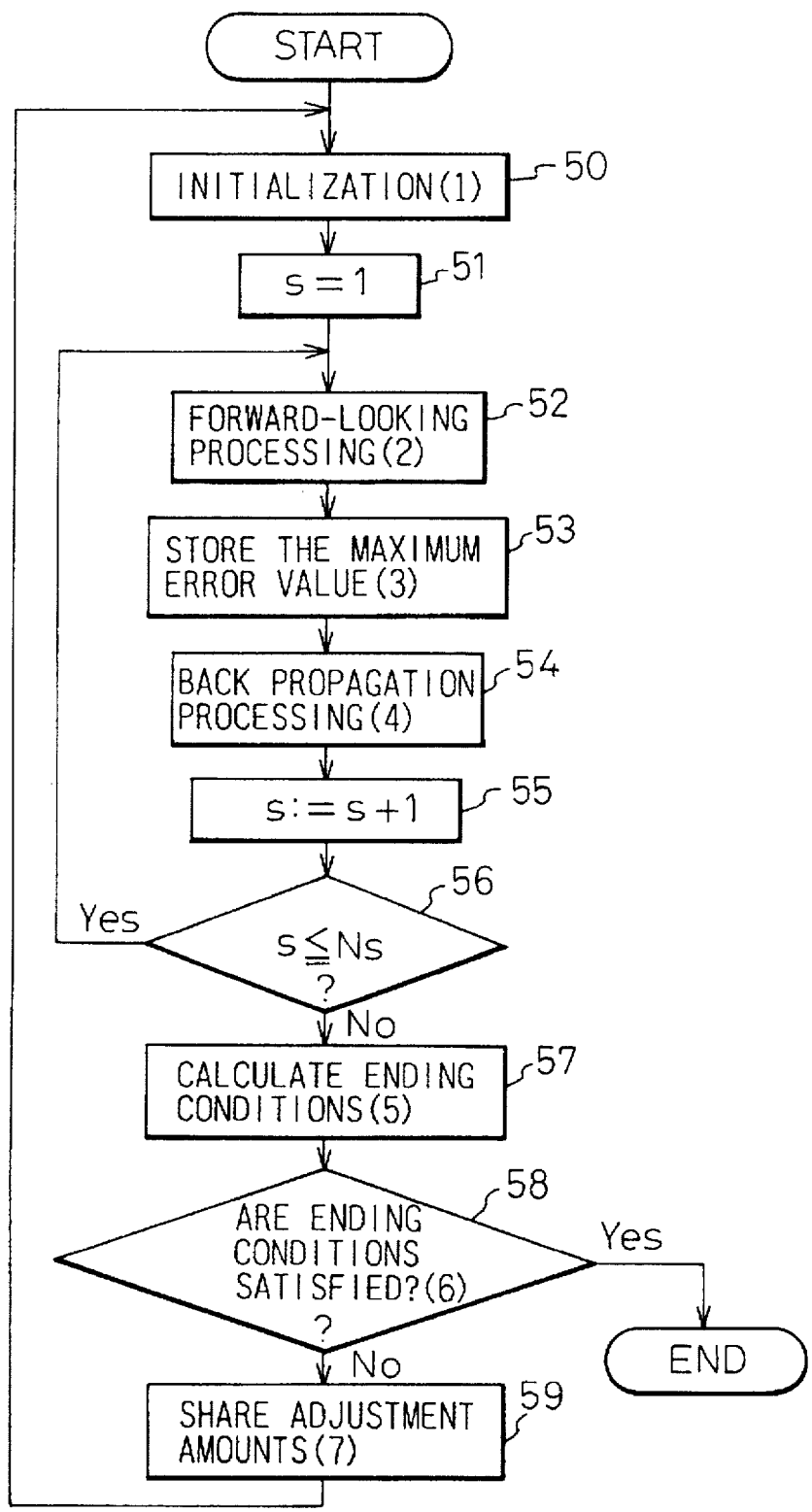
FIG. 6 is flowchart which shows the calculation processing procedure in a parallel data processing system according to the present invention.

FIG. 6 is a flowchart of the procedure which performs the processing which is the object of the present invention, using the parallel data processing system according to the present invention shown in FIG. 5. In FIG. 5, 16 is a means for setting the allowable limit for the error and 17 represents the learning constants.

First, after starting, initialization is performed at step 50. At this step, the weighting adjustment amount variable and maximum error value variable are initialized.

$$\forall_i \forall_j, \Delta W_{ij}^{IH} := 0$$
$$\forall_j \forall_k, \Delta W_{jk}^{HO} := 0 \quad (6)$$
$$e_{max} := 0$$

Further, in the above equations and in equations provided below, $\forall$ and $\Sigma$ can be thought of as being implemented using a loop variable.

Next, at step 51, S=1 is set to selected the first sample data (S), after which processing procedes to step 52, at which forward-looking processing is begun. That is, from the s-th sample data input value and weight, the equations given below are used to calculate the hidden layer H and output layer O neuron output value $\forall_{j,h_j}$, $\forall_k$, $o_k$ and output error $\forall_k$, $e_k^{out}$.

$$\forall_j, h_j := f\left( \sum_{i=1}^{N_i} W_{ij}^{IH} x_i^{(s)(p)} \right) \quad (7)$$

$$\forall_k, o_k := f\left( \sum_{j=1}^{N_h} W_{jk}^{HO} h_j^{(s)(p)} \right)$$

$$\forall_k, e_k^{out} = o_k - t_k^{(s)(p)}$$

Each of the symbols used in this concrete example will be explained once again below.

(1) Weighting in the link between neurons (execution parameter):

The execution parameters are expressed as follows.

$W_{ij}^{IH}$, where i=1 to $N_i$ and j=1 to $N_h$
$W_{jk}^{HO}$, where j=1 to $N_h$ and k=1 to $N_o$
In the above,
i is the input layer neuron index (1 to $N_i$),
j is the hidden layer neuron index (1 to $N_h$),
k is the output layer neuron index (1 to $N_o$),
$W_{ij}^{IH}$ is the size of the weighting in the connection from the input layer i to the hidden layer j, and
$W_{jk}^{HO}$ is the weighting of the connection from the hidden layer neuron j to the output layer neuron k.

Before the execution of the program, the weighting is initialized. These weighting values are updated by means of learning.

(2) Partial sample data (input):

With respect to each of the processors, the following data are set, with p held constant.

$x_i^{(s)(p)}$, where i=1 to $N_i$ and s=1 to $N_s$
$t_k^{(s)(p)}$, where k=1 to $N_o$ and s=1 to $N_s$
In the above,
i is the input layer neuron index (1 to $N_i$),
k is the output layer neuron index (1 to $N_o$),
s is the index with respect to one sample data of the partial sample data (1 to $N_s$),
is the index with respect to the processor (partial learning means) (to $N_p$), and
$x_i^{(s)(p)}$ is the value input for the s-th sample data input to the input layer neuron i of the partial sample data set into the p-th processor.
$t_k^{(s)(p)}$ is the teacher data, which is the value expected to be output from neuron k of the output layer for the s-th sample data of the partial sample data set into the p-th processor.

Before executing the program, the partial sample data is set.

The partial sample data set for each process is different. $N_s$ sample data is set into each processor.

Since there is a total of $N_p$ processors, there is a total of $N_p N_S$ sample data.

(3) Learning constants (input)

$\epsilon^{IH}, \epsilon^{HO}$

In the above, $\epsilon^{IH}$ is the learning constant for the weighting of the connection between the input layer and the hidden layer, this being used in the updating of weighting in back propagation.

$\epsilon^{HO}$ is the learning constant for the weighting of the connection between the hidden layer and the output layer, this being used in the updating of weighting in back propagation.

(4) Hidden layer H neuron output values (intermediate variable)

$h_j$, where j=1 to $N_h$
In the above,
j is the index of a neuron in hidden layer (1 to $N_h$), and
$h_j$ represents the maximum output of the neuron j of the hidden layer.

(5) Output layer O neuron output values (intermediate variable)

$o_k$, where k=1 to $N_o$
In the above,
k is the index of a neuron in the output layer (1 to $N_o$), and
$o_k$ is the maximum output of the neuron k of the output layer (6) Weighting adjustment amounts (intermediate value)

$\Delta W_{ij}^{IH}$, where i=1 to $N_i$ and j=1 to $N_h$
$\Delta W_{jk}^{HO}$, where j=1 to $N_h$ and k=1 to $N_o$
In the above,
i is the index of a neuron in the input layer I (1 to $N_i$),
j is the index of a neuron in the hidden layer H (1 to $N_h$),
k is the index of a neuron in the output layer O (1 to $N_o$),
$\Delta W_{ij}^{IH}$ represents the weighting adjustment amount for the connection from the neuron i of the input I to the neuron j of the hidden H, and
$\Delta W_{jk}^{HO}$ represents the weighting adjustment amount for the connection from the neuron j of the hidden layer H to the neuron k of the output layer O.

By means of learning, the weighting adjustment amounts for all sample data are accumulated. The weighting is updated by adding the overall total of the adjustment amounts to the weighting (7) Output error (intermediate variable)

$e_k^{out}$

In the above, $e_k^{out}$ is the neuron output error in the output layer O, that is, this represents the difference between the actual output and the teacher data, which is the expected output, and this is used in calculating the amounts off weighting adjustment.

(8) Maximum error value (intermediate variable)

$e_{max}$

This variable is used to store the maximum value of error between the output value from an output layer neuron and the expected value (teacher data).

This is used in determining whether or not to end learning.

(9) Intermediate error of a neuron in the output layer O (intermediate variable)

$$e_k^o$$

In the above, k is the index of a neuron in the output layer O.

This $e_k^o$ represents the intermediate error of a neuron in the output layer O in back propagation, and is used is calculation of weighting adjustment amounts.

(10) Intermediate error of a neuron in the hidden layer H (intermediate variable)

$$e_j^H$$

In the above, j is the index of a neuron in the hidden layer H.

This $e_j^H$ represents the intermediate error of a neuron in the hidden layer H in back propagation, and is used is calculation of weighting adjustment amounts.

In the forward-looking processing performed at step 52, as described previously, while at each of a plurality of data processing means 1 is stored all of the execution parameters, the sample data is divided up into a number of partial sample data parts that is equal in number to the number of data processing means 1, one of these partial sample data being stored at each of the data processing means 1. It is not necessary to divide the sample data into partial sample data having the same number of data each.

Next, processing proceeds to step 53, at which, for the output values obtained at step 52, maximum value of the error between the teacher data and the output value, $\forall_k, e_k^{out}$ ($=ok-t_k^{(s)\ (p)}$) is stored. $t_k^{(s)\ (p)}$ is stored.

That is, the maximum value of output error is always held in memory.

$$e_{max}' = max\ (e_{max}, max\ |e_k^{out}|) \qquad (8)$$

Next, processing proceeds to step 54, at which back propagation is performed. That is, the error obtain in the previous steps is used as the basis for calculation of the adjustment amounts DW by, for example, the most rapid dropoff method.

$$\forall_k, e_k^o := e_k^{out} o_k (1-_k)$$

$$\forall_j, \forall_k, \Delta W_{jk}^{HO} := \Delta W_{jkHO} - \epsilon^{HO} e_k^o h_j \qquad (9)$$

$$j, ej^H := \left( \sum_{k=1}^{N_o} W_{jk}^{HO} e_k^o \right) h_j (1-h_j)$$

$$\Delta_i, \Delta_j, \Delta W_{ij}^{IH} := W_{ij}^{IH} - \epsilon^{IH} e_j^H x_i$$

In each of the above equations, the calculation method is substantially the same as that described previously for determining ΔW. Then, processing proceeds to step 55, at which the sample number is incremented by one and a different sample number S is selected. At step 56, if the selected sample number S is less than the number of partial sample data $N_s$, return is made to step 52, from which the processing of the above-described steps is repeated, but if the result is NO at step 56, that is, if the above-described processing has been completed for all the partial sample data, processing proceeds to step 57, at which point processing is begun to determine whether or not to end the processing that determines the adjustment amounts. That is, at step 57 a determination is first made as to whether or not above-output error for the partial sample data held by each of the data processing means 1 is within the above-mentioned allowance.

If the error for all of the partial sample data is within this allowance, the learning of the data processing means 1 is ended.

In this case, the endflag of the data processing means 1 is set to, for example, TRUE, and then in the case in which the output error for the partial sample data held by each processor is within the allowance, the endflag of that processor (data processing means 1) is set to TRUE.

In the case in which the endflags for all of the processors are TRUE, the learning in the present invention is ended. Subsequently, the endflag for each processor is set into its tray 2, and shifted in bucket-brigade fashion to be read out, thus calculating the allendflag which is the condition for ending of all learning.

As an example of the calculation algorithm of this step, we have the following.

if $e_{max}$ <allowance then endflag:=TRUE else endflag:= FALSE allendflag:=endflag tray:=endflag shift tray, allendflag:=allendflag AND tray The above is repeated (p-1) times.

In the above, "tray" indicates the transfer data holding means 2 which make up the data transfer means 3, and it is via these that communications between processors is performed. The three operations of writing to the tray, reading from the tray, and shifting are performed.

That is, in step 57 by causing the transfer data holding means 2 which has the shift register function of the data transfer means 3 to circulate the accumulation of the weights with regard to partial sample data in all of the data processing means 1 the overall total of these accumulations is calculated.

Processing then proceeds to step 58, at which a determination is made as to whether or not the results of the calculation meet the condition for ending this calculation processing operation. That is, in the above-mentioned example in the present invention, if allendflag as the condition for ending learning is TRUE, learning is ended. That is, if allendflag=TRUE then go to END.

At the above-mentioned step 58, if the result is YES, that is, if the above-mentioned ending condition is satisfied, this routine goes to END.

If, on the other hand, the result at step 58 is NO, processing proceeds to step 59, and processing to share the adjustment amounts, return in made to step 50, from which all of the above-described steps are repeated. Further, in step 59, by using trays 2 to share the weight adjustment amounts according each of the partial sample data calculated by each of the processors, the overall total of the weight adjustment amount for the full sample data is added to the original weight.

By doing this, the updating (learning) of the weight for all the sampled data is performed. The following algorithm is executed with respect to $\forall_i$ and $\forall_j$.

tray:$\Delta W_{ij}^{IH}$ shift tray, $W_{ij}^{IH} := W_{ij}^{IH}$+tray

The above is repeated p times.

With respect to $\forall_j$ and $\forall_k$, the following is executed.

tray:=$\Delta W_{ik}^{HO}$ shift tray, $W_{ij}^{HO} := W_{ik}^{HO}$+tray

The above is repeated p times.

Next, a comparison will be made of the processing speed of the above-described concrete example of the parallel data processing system according to the present invention and the processing speed of the previous examples mentioned above (for example, Japanese Unexamined Patent Publication (Kokai) No. 3-105584).

A simple evaluation will be made of the learning performance of the prior art and of this embodiment 1 with regard to a 3-layer hierarchical neural network.

The time T required to determine the weight adjustment amounts for all the sample data will be calculated and compared.

In the case of the prior art, the communications time for communications between partial learning means of the partial execution parameters can be thought of as being zero, since this is performed simultaneously with the calculation of the product sum.

$$T = T_f + T_b$$

In the above, $T_f$ is the time required for forward-looking processing and $T_b$ is the time required for back propagation processing.

If the number of partial learning means, $N_1$ used to increase the level of parallelness is taken to be sufficiently high, $$N_1 = max(N_i, N_h, N_o),$$

since the parallel product sum calculation is performed by the data transfer means, we have the following.

$$T_f = c_f N_p (N_i + N_h)$$

$$T_b = c_b N_p (N_h + N_o)$$

In the above, $c_f$ is the average calculating time for each weight in forward-looking processing, and $c_b$ is the average calculating time for each weight in back propagation processing.

In the case of the present invention, during the time for calculating the weight adjustment amount for the partial sample data, because the processing is closed within the partial learning means, the communications time is zero. However, after processing is performed one time with regard to all the sample data, there is a need for communications just one time, in order to share the partial weighting adjustment amounts for the partial sample data among all of the partial learning means, for the purpose of determining the overall weight adjustment amount.

Therefore, the learning time is as follows.

$$T = T_f' + T_b' + T_{comm}$$

In the above, $T_f'$ is the calculation time for forward-looking processing using partial sample data, $T_b'$ is the calculation time for back propagation processing using partial sample data, and $T_{comm}$ is the time to determine the overall total of the overall weighting adjustment amount by means of communications.

In addition, the following equation obtains.

$$T_f' = c_f \frac{N_p}{N_1} (N_i N_h + N_h N_o) \quad (10)$$

$$T_b' = c_b \frac{N_p}{N_1} (N_i N_h + N_h N_o)$$

$$T_{comm} = c_{comm} N_1 (N_i N_h + N_h N_o)$$

To simplify the comparison, the learning time will be calculated for the case in which the number of neurons in each layer is equal, that is, for the case of $$N_i = N_h = N_o = N$$

The learning time for the prior art is as follows.

$$T_{old} = 2N_p N(c_f + c_b) \propto N_p N$$

Thus, it is proportional to the number of sample data and also to the number of neurons in one layer. In this case, the number of partial learning means $N_{opt}$ is given as $N_{opt} = N$.

The learning time for this embodiment of the present invention is as follows.

$$T_{new} = \frac{2N_p}{N_1} (c_f + c_b) N^2 + \quad (11)$$

$$2c_{comm} N^2 N_1 \geq 4N^2 \sqrt{(c_f + c_b) c_{comm} N_p} \propto N^2 \sqrt{N_p}$$

In the above relationship, the equal sign applies in the case in which there are an optimum number of partial learning means, $N_{opt}$ $$N_{opt} = \sqrt{\frac{(c_f + c_b) N_p}{c_{comm}}} \quad (12)$$

When the number of partial learning means is the optimum number, $N_{opt}$, the learning time in this embodiment is proportional to the square root of the number of sample data and also proportional to the square of the number of neuron in each layer.

Therefore, between the number of sample data $N_p$ and the number of neurons N in each layer N, if the relationship $$N_p \geq \frac{4c_{comm}}{c_f + c_b} N^2 \quad (13)$$

obtains, then the relationship $$T_{old} \geq T_{new}$$

obtains.

In general, since the number of sample data is by far larger than the number of execution parameters, in this case the square of the number of neurons in each layer, the concrete example of the present invention, in comparison with the prior art, is more effective.

Next, yet another concrete embodiment (2nd embodiment) of a parallel data processing system according to the present invention will be described.

Figure 7:
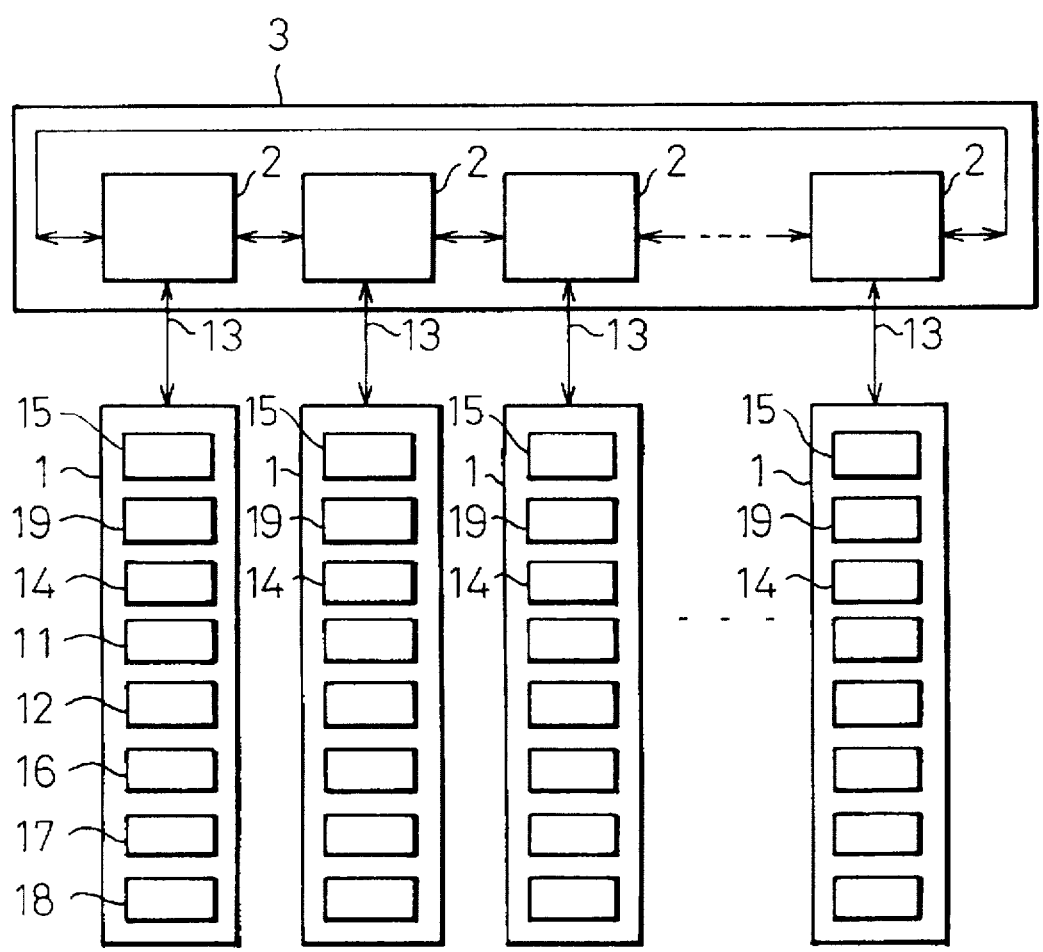
FIG. 7 is a block diagram which shows the configuration of a 2nd concrete example of a parallel data processing system according to the present invention.

FIG. 7 is a drawing describing the 2nd embodiment of the present invention, which represents a neuron computer which performs error back propagation learning. Elements in this figure which are the same as in FIG. 5 have been given the same symbols as in FIG. 5.

In essence, the difference between this concrete embodiment (2nd embodiment) and the previously described concrete embodiment (1st embodiment) shown in FIG. 5 is that are additions of last sample data holding means 18 and of judgment means 19 which judge whether or not to use partial sample data in updating of adjustment amounts, these additions being made to the data processing means 1 with the remaining part of the configuration being almost the same as shown in FIG. 5.

That is, in the 2nd embodiment of the present invention, while the basic calculation processing procedure is substantially the same as in the 1st embodiment, in this 2nd embodiment a mechanism for judging whether or not to use sample data in the accumulation of adjustment amounts has been added, thus enabling the implementation of a parallel learning system which can perform learning without problems even in the case in which the number of sample data $N_p$ is not an integral multiple of the number of partial learning means $N_1$.

What this means is that while the 1st embodiment was based on the assumption that the number of partial sample data $N_p$ is equal to an integral multiple of the number of partial learning means, that is the number of data processing means, $N_p$, the 2nd embodiment is based on the assumption of calculation processing being performed in the case in which the number of partial sample data $N_p$ does not correspond to an integral multiple of the number of data processing means $N_1$.

In this condition, if for example the number of partial sample data $N_p$ is smaller than the number of data processing means $N_1$, it is necessary to establish which of the data processing means are to be used and which to allow to remain idle.

The calculation processing algorithm in this case is as follows.

Since the number of partial sample data $N_p$ is not an integral multiple of the number of partial learning means $N_1$, the following relationship obtains.

$$N_p = kN_1 - r$$

k: An integer $$0 \leq r < N_1$$

When we consider that k corresponds to the number of partial sample data, when accumulating the adjustment amounts for the execution parameters (weights), if each of r partial learning means processes one dummy partial sample data and the accumulation of of adjustment amounts is not performed in those cases, it is possible to properly perform calculation of the adjustment amounts even in the case in which the number of sample data $N_p$ is not an integral multiple of the number of partial learning means $N_1$.

Specifically, this makes use of a last sample data use flag (enduseflag), this flag indicating whether or not the last sample data of the partial sample data is or is not to be used in learning.

The last sample data use flag is used in error calculation, and if enduseflag=FALSE, the error is forcibly set to zero.

In actual calculation processing, with regard to the last sample data of the partial sample data, reference is made to the last sample data use flag enduseflag, and a judgment is made by the algorithm shown below as to whether or not to use that sample data, and if the data is not to be used, the error is forcibly set to zero.

if (s=Ns) AN (Denduseflag=FALSE) then $\forall_k$, $e_k^{out} = 0$

Figure 8:
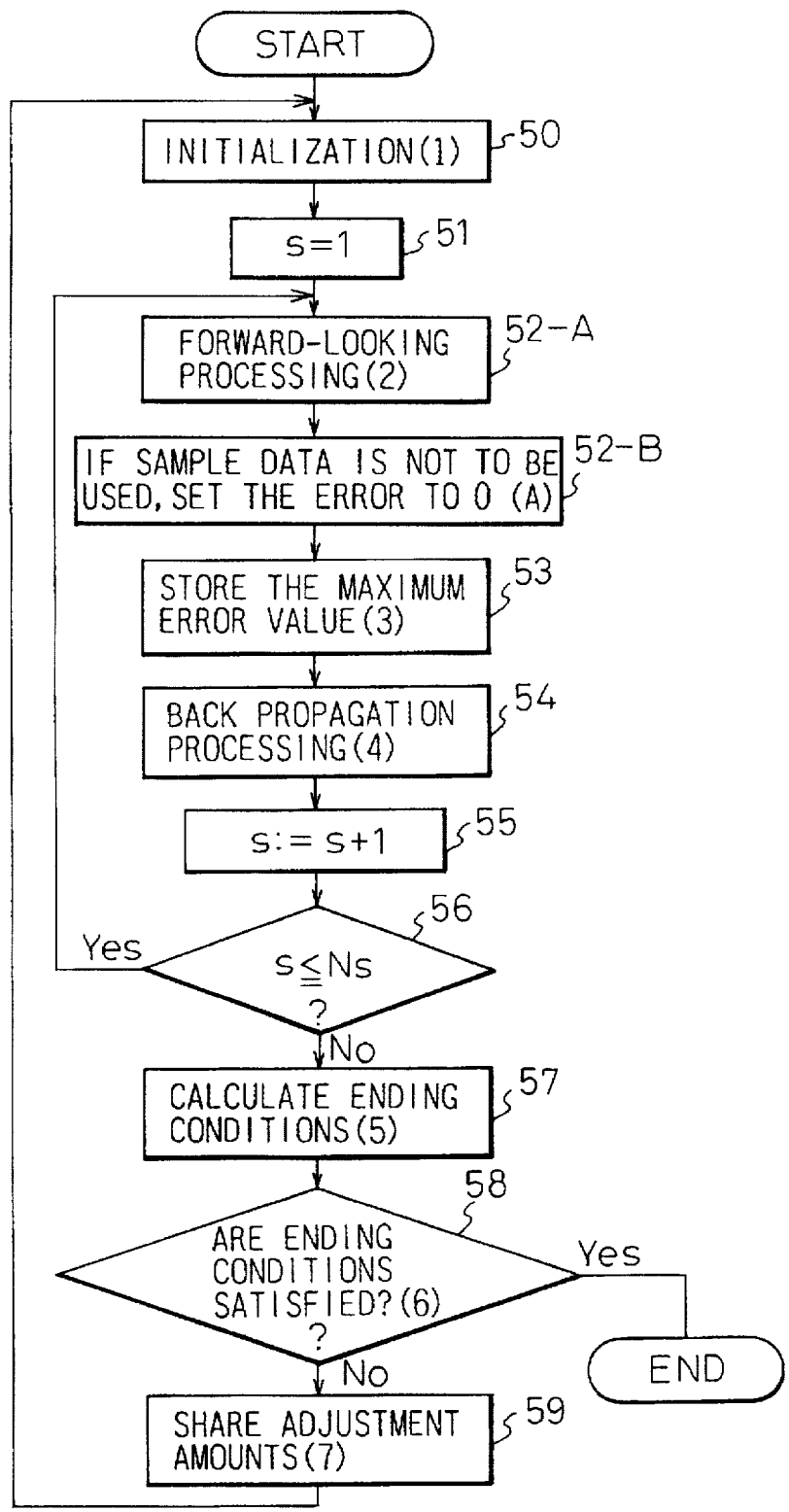
FIG. 8 is a flowchart which shows the calculation processing procedure of a parallel processing system according to the present invention which is shown in FIG. 7.
Figure 9:
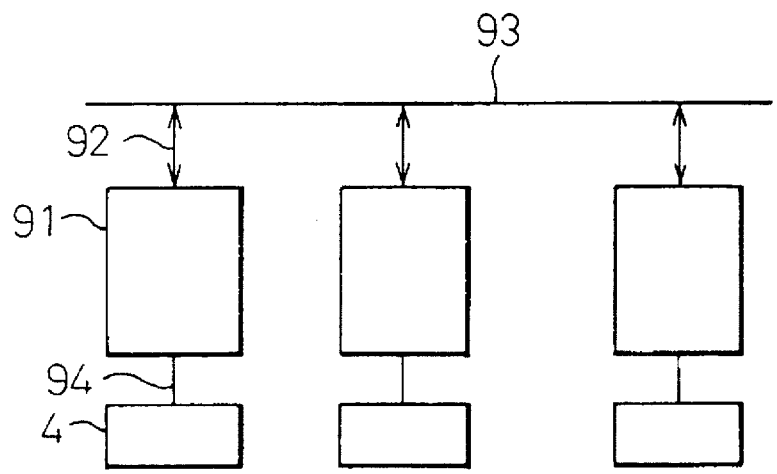
FIG. 9 is a block diagram which shows a example of the configuration of a data processing system with a common bus as used in the past.
Figure 10:
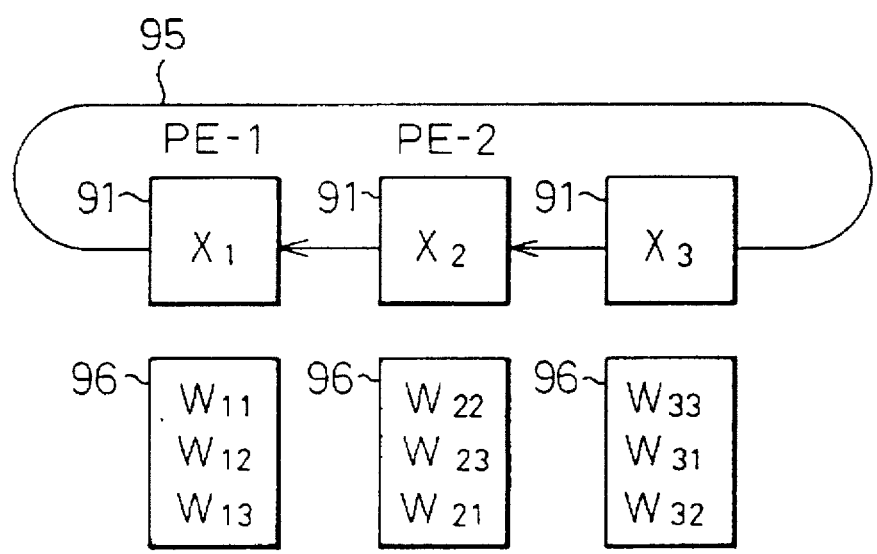
FIG. 10 is a block diagram which shows an example of the configuration of a data processing system of the past which using the ring systolic method.
Figure 11:
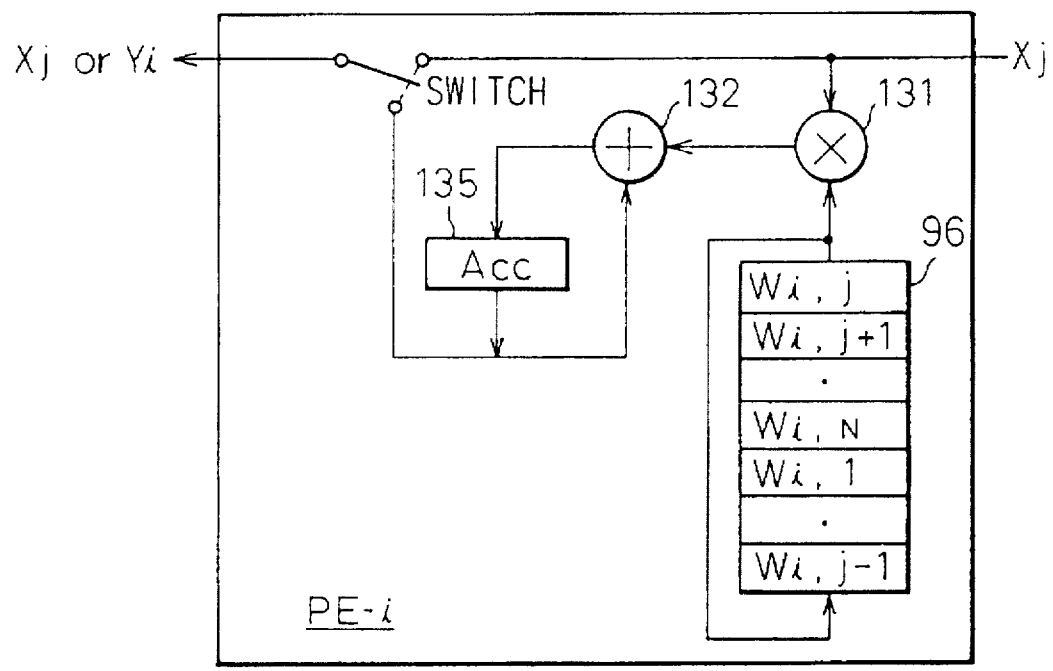
FIG. 11 is a block diagram which shows an example of the configuration of a circuit used to implement a data processing system using the ring systolic system, which is shown in FIG. 10.
Figure 12:
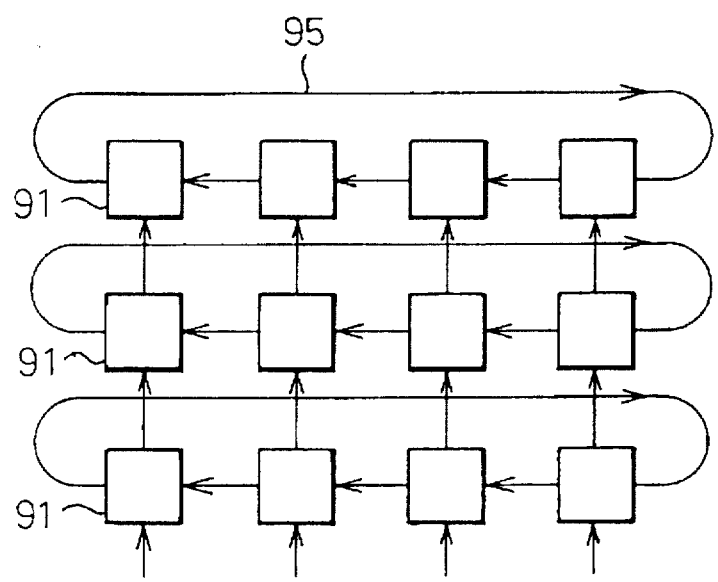
FIG. 12 is a block diagram which shows an example of the configuration of another data processing system of the past which uses the ring systolic method.
Figure 13:
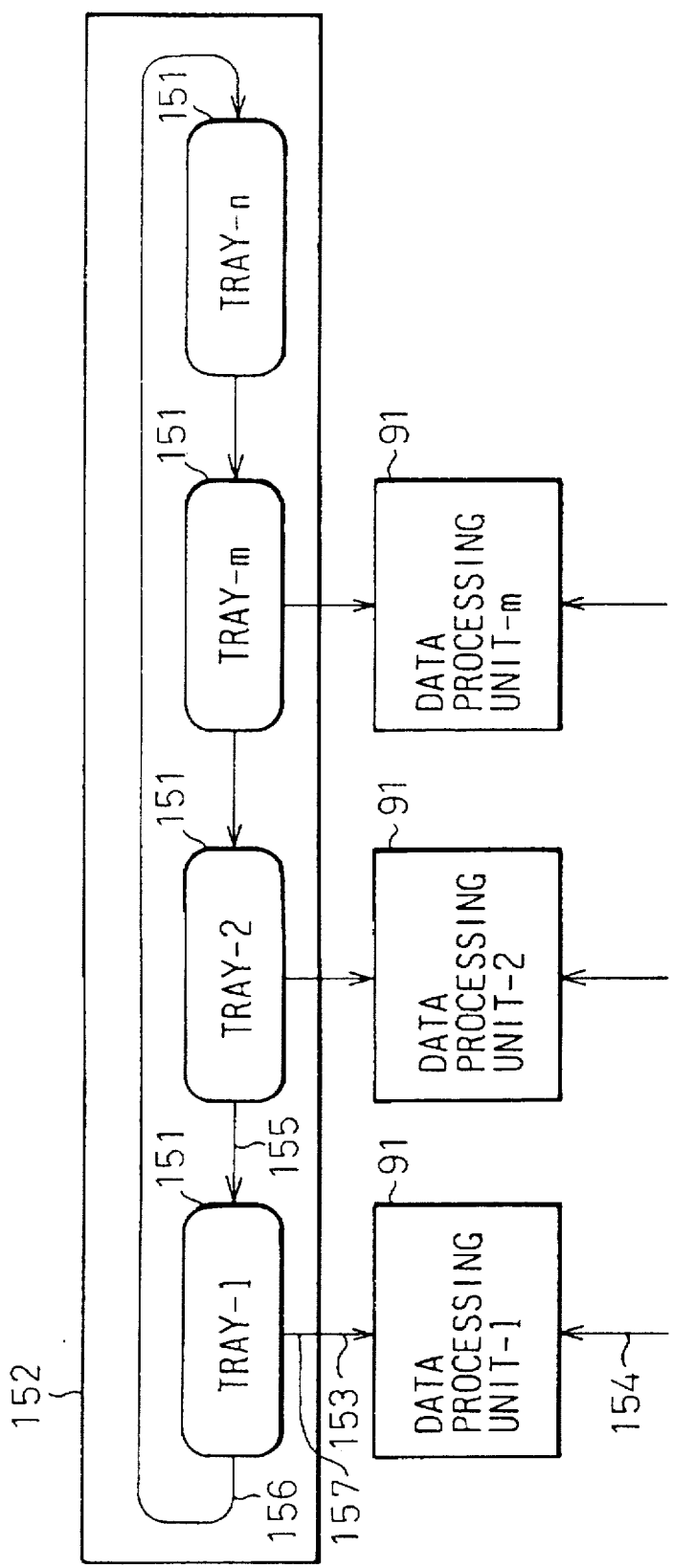
FIG. 13 is a block diagram which shows an example of the configuration of another data processing system of the past.

The procedure for this calculation processing, as shown in the flowchart of FIG. 8, is virtually the same as that of the flowchart of FIG. 6, with the difference being that first at step 52-A the same forward-looking processing is performed as described previously. Next, processing proceeds to step 52-B, at which a judgment is made as to whether the current sample data is or is not to be used in weight adjustment, and if it is to be used, processing proceeds as is to step 53, but if it is not to be used, the error data is made zero and processing proceeds to step 53.

As described above, in performing learning using a number of sample data that is large in relation to the number of execution parameters, because the present invention is capable of achieving a higher parallelness than the prior art, and of executing learning in a shorter time, it makes a great contribution to the improvement of the learning performance of adaptive systems.

We claim:

1. A parallel data processing system comprising:

plural means for data processing; and means for data transfer, each of the plural means for data processing being connected to said means for data transfer, and further comprising:

means for holding execution parameters that are required for data processing, means for holding partial sample data which comprises at least part of full sample data necessary for required data processing, adjustment value calculation means for calculating, from said partial sample data stored in said means for holding partial sample data and from said execution parameters held in said means for holding execution parameters, adjustment amounts related to said execution parameters with regard to said partial sample data, and accumulation means for calculating an overall total of said execution parameter adjustment amounts with regard to the full sample data, and for accumulating the adjustment amounts related to said execution parameters with regard to said partial sample data at said means for data processing and the adjustment amounts related to said execution parameters with regard to partial sample data at other said means for data processing via said means for data transfer.

2. A parallel data processing system according to claim 1, wherein said plural means for data processing forms a neural network.

3. A parallel data processing system according to claim 1 or claim 2, wherein each of said plural means for data processing further comprises a mechanism for judgment which, when calculating said adjustment amounts with regard to said partial sample data, judges whether or not the partial sample data held by said means for holding partial sample data thereof is to be used in updating processing of said adjustment amounts.

* * * * *

UNITED STATES PATENT AND TRADEMARK OFFICE
CERTIFICATE OF CORRECTION

PATENT NO. : 5,627,944

DATED : May 6, 1997

INVENTOR(S) : FUJIMOTO et al.

It is certified that error appears in the above-indentified patent and that said Letters Patent is hereby corrected as shown below:

Col. 2,     line 21, change "$w_{ij}$" to --$W_{ij}$--;
               line 23, after "contents" insert --of--.

Col. 3,     line 34, change "NO." to --No.--;
               line 56, after "151," insert --if--.

Col. 4,     line 11, change "o" to --of--;
               line 20, change "or" to --for--;
               line 24, change "abovementioned" to --above-mentioned--;
               line 34, change "or" to --for--.

Col. 6,     line 48, change "i" to --1--;
               line 49, change "includes" to --included--;
               line 54, change "lot" to --for--.

Col. 7,     line 3, change "o" to --of--;
               line 13, change "wilt" to --with--;
               line 17, change "ms" to --is--; and change "or" to --for--;
               line 28, after "of" insert --a--;
               line 35, change "ms" to --is--;
               line 42, change "propose." to --proposed.--.

Col. 8,     line 1, at the end of the equation, change ")'" to --$)^T$--;
               line 64, in the equation, change "($W_T$" to --($W^T$--;
               line 65, in the equation, change "($W_T$" to --($W^T$--.

UNITED STATES PATENT AND TRADEMARK OFFICE
CERTIFICATE OF CORRECTION

PATENT NO.   :   5,627,944
DATED        :   May 6, 1997
INVENTOR(S)  :   FUJIMOTO et al.

It is certified that error appears in the above-indentified patent and that said Letters Patent is hereby corrected as shown below:

Col. 9,    in equation (4), third line, change "$(t_1^{(k)}...$" to --$(t_1^{(k)}t_2^{(k)}...$--.

Col. 10,   equation (5), end of third line, change "$_p^{(k)}$" to --$i_p^{(k)}$--.

Col. 11,   line 59, change "is the" to --p is the--.

Col. 12,   line 59, change "off" to --of--.

Col. 13,   line 32, after "stored." (first occurrence) delete the remainder of the line;
in equation (9), second line, change "$\Delta W_{jkHo}$" to --$\Delta W_{jk}^{Ho}$--;
equation (9), beginning of third line, change "$_j$," to --$\forall_j$,--;
equation (9), the fourth line should read: --$\forall_i,\forall_j,\Delta W_{ij}^{IH}: =\Delta W_{ij}^{IH}-\epsilon^{IH}e_j^H x_i$--.

Col. 16,   line 54, after "that" insert --there--.

Signed and Sealed this

Ninth Day of September, 1997

Attest:

BRUCE LEHMAN

*Attesting Officer*     Commissioner of Patents and Trademarks